United States Patent [19]

Frias et al.

[11] Patent Number: 5,271,138

[45] Date of Patent: Dec. 21, 1993

[54] THERMAL ANEMOMETER

[75] Inventors: Louis J. Frias, Hales Corners; Ronald J. Frias, Germantown, both of Wis.

[73] Assignee: IMC Instruments, Inc., Menomonee Falls, Wis.

[21] Appl. No.: 779,406

[22] Filed: Oct. 17, 1991

[51] Int. Cl.⁵ .............................................. G01F 1/68
[52] U.S. Cl. ..................................... 29/428; 29/530; 29/557; 72/367
[58] Field of Search ............... 29/557, 558, 530, 428; 72/367, 370; 73/202.5, 204.11, 204.22

[56] References Cited

U.S. PATENT DOCUMENTS

| | | | |
|---|---|---|---|
| 1,091,751 | 3/1914 | Mogan et al. | 72/367 X |
| 2,022,234 | 11/1935 | Everett | 29/557 X |
| 2,704,882 | 3/1955 | Olson | 29/558 X |
| 4,537,068 | 8/1985 | Wrobel et al. | 73/202 |

Primary Examiner—Joseph M. Gorski
Attorney, Agent, or Firm—Andrus, Sceales, Starke & Sawall

[57] ABSTRACT

An anemometer includes a tubular cylindrical housing having an outer sensing end portion with a sensing passageway formed by opposite parallel flat walls integrally formed with the tubular cylindrical housing. A rod-like sensor is mounted centrally between the flat walls and adjacent the upstream opening to the passageway. An ambient temperature element sensor and a compensator, each in the form of a flat chip, are adhesively bonded by a flexible adhesive to the inner wall surface of immediately adjacent the passageway. In the forming method, a tubular cylindrical member of hardened stainless steel has diametric openings formed in an outer sensing end. A press is coupled to the opposite curved walls of the passageway and the walls flattened to form the integral, parallel flat walls.

8 Claims, 2 Drawing Sheets

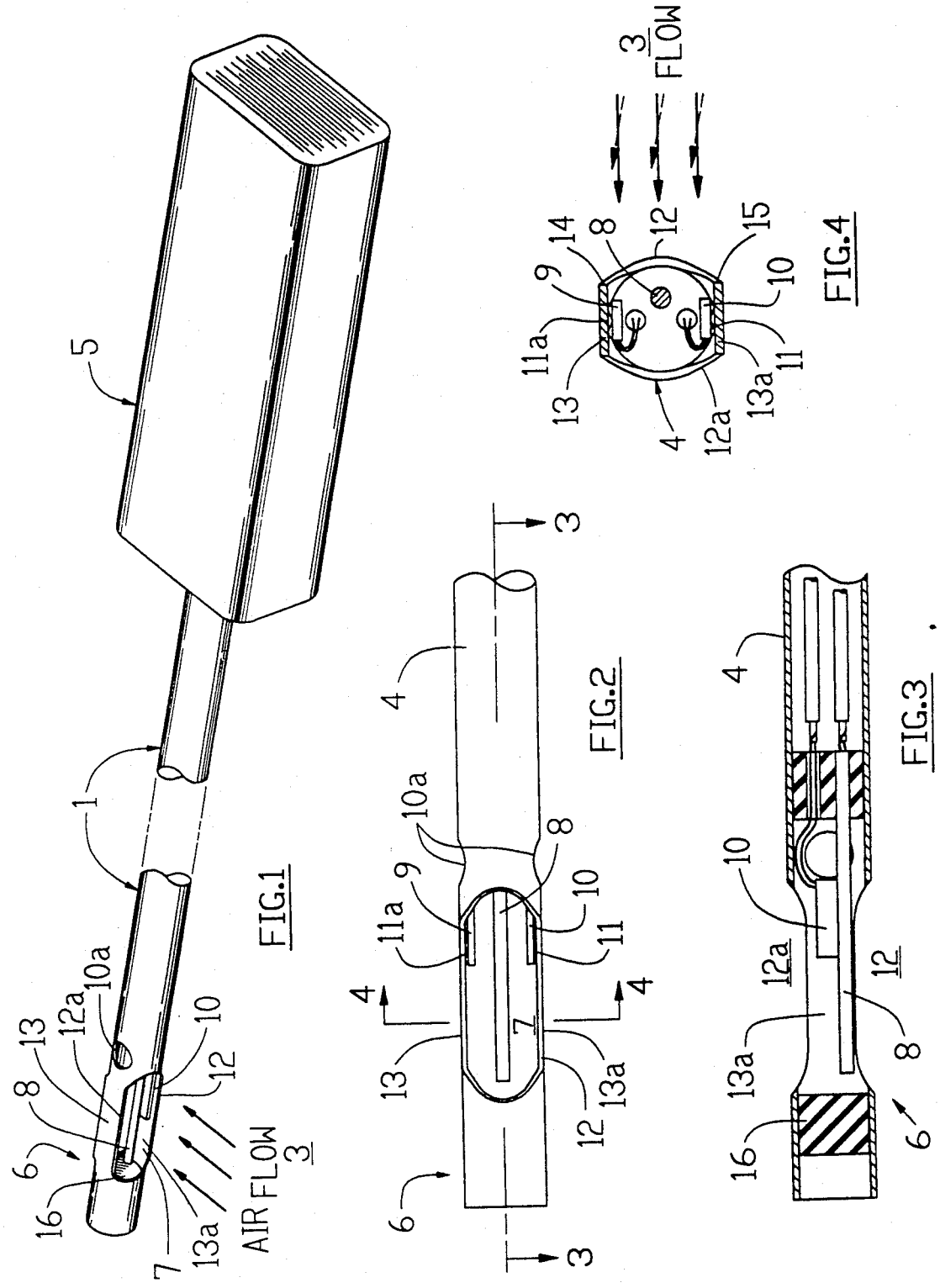

THERMAL ANEMOMETER

BACKGROUND OF THE INVENTION

This invention relates to a thermal anemometer for measuring velocity of a gaseous flow and particularly to an air flow measuring apparatus for measuring the velocity of an air stream.

In many design developments, control systems and operating systems, detecting or measuring the velocity of the flow of a gaseous medium, and particularly air, is required. A known measuring system includes passage of a portion of the air stream through a passageway including a heated element and comparing the temperature of that element with an ambient air temperature sensing element. A dual element thermal measuring device is disclosed, for example, in U.S. Pat. No. 4,537,068 which issued Aug. 27, 1985.

The velocity monitoring apparatus is advantageously constructed as an elongated wand to provide a portable unit which can be used for monitoring of air flow in various locations. Typically, a thin unit includes a tubular housing with the outer end formed with a narrow sensing passageway as machined part. The heated and ambient temperature elements are mounted within the passageway and connected into a sensing circuit by suitable circuitry passing through the tubular member to an outer handle. The sensing passageway must be carefully shaped to provide accurate detection of the air velocity. Accurate and repeatable velocity measurement also requires relatively precise location of the sensing passageway with respect to the path of the air flow. Thus, rotation of the sensing passageway with respect to the air flow can vary the characteristic of the air flow therethrough, resulting in a distorted output from a true value. Generally, the prior art has used the special outer end member formed as a machined metal part to precisely form a rectangular opening within the outer end of the rod unit. With a precisely machined opening and with accurate and careful location of the wand within the air flow, accurate and repeatable of the air velocity can be obtained. Machined parts are costly and an alternative less costly structure would have significant economic value. The inventor has made an alternate low cost construction using a continuous tubular member with openings cut in opposite sides of the outer end of the tube, using a milling machine or the like, to accurately form identical openings to the opposite side of the tube. Although this structure produces a less expensive and reliable sensor, it is also subject to the requirement of accurate positioning with respect to the air flow such that the passageway is essentially parallel to the path of air flow. Turning of the tube in the plane of the air flow or rotation of the tubular member within the plane of the air flow such that the passageway is not precisely parallel to the air flow changes the output readings. Further, the inventor realized that the inside curved wall structure of the opening may create turbulence which interferes with the output readings.

SUMMARY OF THE PRESENT INVENTION

The present invention is particularly directed to an improved thermal anemometer formed of an elongated tubular member with the outer end formed of a tubular cylindrical member with a sensing passageway formed by opposite parallel flat walls integrally formed with the cylindrical member, and in particular formed by flattening of the cylindrical members after cutting of the openings in the opposite sides of the tubular member. More particularly in accordance with the present invention, an elongated tubular cylindrical member of a suitable metal such as a hardened stainless steel is formed or selected. Openings are formed in the opposite sides of the outer end and forming a sensing end. The opposite walls of the passageway defined by the aligned openings are then flattened by any suitable means such as a suitable press unit. The openings are formed with a suitable cutting device to provide finished edges or the edges are subsequentially finished for optimal construction of the passageway. The thermal sensing elements are then mounted within the passageway and preferably, in accordance with a preferred construction, a heated rod-like element located generally centrally between the flattened walls and immediately adjacent to the upstream end of the sensing passageway. In addition, an ambient temperature element is a small flat-like element and is flexibly bonded to the inner wall surface of the tubular member immediately at or adjacent the passageway. The element is preferably secured in place using a thin layered flexible adhesive. The outer end of the tubular member is sealed such as by a introduction of a thermal setting plastic which will seal to the inner wall of the tubular member.

The present invention provides an accurate and sensitive passageway which can be repeatably and accurately located in parallel relation to the air flow and establish an air flow with minimal turbulence and interference with the air flow and thereby provide repeatable and accurate output readings. In addition, it provides a practical and cost efficient method of manufacture of an anemometer sensor using present day known materials and technology. The system is of course particularly adapted to mass production because of the ready availability for example of the necessary tubular material, known methods of forming the necessary openings and shaping of walls and the like with minimum skill requirements while maintaining all of the advantages of the machined parts such as used in prior art anemometers.

BRIEF DESCRIPTION OF THE DRAWINGS

The drawings herewith generally illustrate the best mode presently contemplated for the invention and are described hereinafter.

In the drawings:

FIG. 1 is a pictorial view of a wand-type thermal anemometer constructed in accordance with the teaching of the present invention;

FIG. 2 is an enlarged side elevational view of the flow sensing end of the anemometer shown in FIG. 1;

FIG. 3 is a longitudinal cross section taken generally on line 3—3 of FIG. 2;

FIG. 4 is a vertical cross section through the thermal anemometer shown in FIG. 2;

DESCRIPTION OF THE ILLUSTRATED EMBODIMENT

Figure 5:
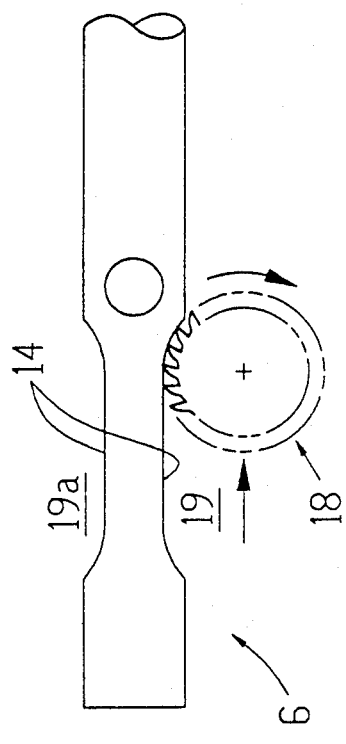
FIG. 5 is a view illustrating a first step in one method of forming the thermal anemometer of FIGS. 1–4.

Referring to the drawings and particularly to FIG. 1, a thermal anemometer 1 is illustrating an embodiment of the invention shown mounted within an air duct 2 with air flow 3 therethrough. The thermal anemometer 1 is an elongated wand unit having an outer tubular housing 4 formed from a thin wall tube of a relatively small diameter. The one end of the housing 4 is provided with a handle and housing 5 for manual manipulation of the wand-type unit. The outer end portion 6 of the tubular housing 4 is specially formed with a sensing passageway 7 extending diametrically therethrough. A rod-like heated sensor 8 is mounted within the upstream end of the passageway 7. An ambient temperature sensor 9 and a compensator 10 are located to opposite sides of sensor 8 and adjacent to one end of the sensing passageway 7, shown to the handle side of the housing 4. The sensor 9 and 10 are each compensators shown as a flat chip member and each is secured to the housing by a flexible adhesive 11 and 11a, respectively. Holes 10a, which permit some flow over the elements and 10 thereby reduce the response time.

The passageway 7 is particularly formed with diametric opposite side openings 12 and 12a and with the opposite walls of the passageway formed as flattened sidewalls 13 and 13a. The walls 13 and 13a are not only flat but parallel to each other. In addition, the inlet or upstream opening 12 of the passageway 7 has the edges 14 and 15 formed as smooth wall surfaces so as to produce minimum turbulence and interference with the air flow into and through the passageway 7.

The outer end of the tubular housing end portion 6 is sealed by a suitable material 16, shown as a plastic material.

The inventor has found that the tubular metal housing 4 with the specially formed sensing passageway 7 including the flattened parallel sidewalls 13 and 13a provides a highly sensitive and cost effective sensing passageway which can be readily mounted in parallel relationship to the air flow and with minimal turbulence thereby producing accurate readout of the velocity of the air flow and with repeatable results. The sensed output is particularly improved with the mounting of the rodlike heated element 8 at the upstream end of the sensing passageway 7, as most clearly shown in FIGS. 3 and 4. The mounting of the ambient temperature sensor 9 and the compensator 10 with the flexible adhesive 11 and 11a so as to minimize distortional effects resulting from any change in the wall structure with temperature changes.

Figure 6:
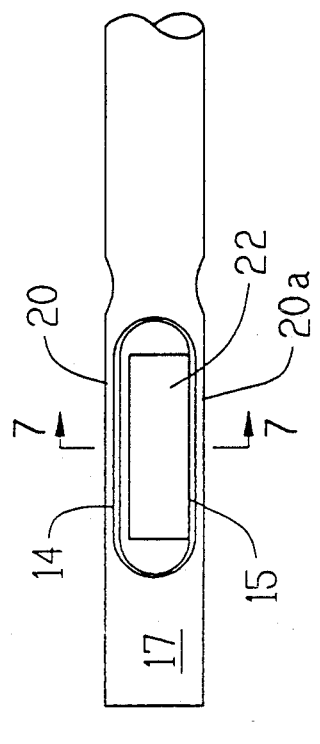
FIG. 6 is a view illustrating a second step in the forming of a thermal anemometer of FIGS. 1–4.
Figure 7:
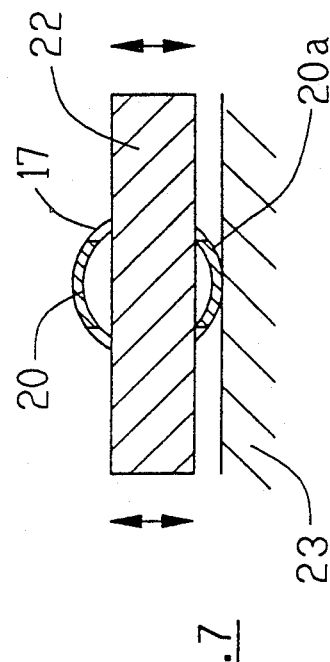
FIG. 7 is a diagrammatic view illustrating a further step in completing the thermal anemometer of FIGS. 1–4.

The present invention also provides an inexpensive and practical method of implementation. In constructing of the unit, the tubular housing 4 is readily available as a preformed commercial tube element formed of an appropriate hardened stainless steel. The housing 4 can be and is preferably formed as a single integral tubular housing extending throughout the length of the wand for connection to handle and housing 5. In any event, the outer end portion of the housing 4 is formed as an integral tubular cylindrical member 17, as shown in FIGS. 5-7. A suitable cutting unit 18 forms diametric openings 19 and 19a in the tubular cylindrical member 17. In the illustrated embodiment of FIGS. 5-7, a simple milling cutter 18 is used to form the openings. Such cutters are well known and provides accurately formed openings without distortion of the edges 14 and 15.

Further, if the edges 14 and 15 are not formed with an appropriate smooth surfaces, the edges can be readily finally polished or processed in any suitable means to form appropriate smooth edges, particularly on the upstream side of the passageway. After forming of the openings 19 and 19a, the opposite walls 20 and 20a defining the openings include the curvature of the tubular housing 4. The curved walls 20 and 20a are then suitably flattened to form the parallel flat sidewalls 13 and 13a. One method of forming the sidewalls is illustrated in FIGS. 6 and 7, wherein a flat press ram 22 is located within the passageway opening. A platen or anvil 23 located beneath the bottom curved wall 20a. The length of the press ram 22 generally corresponds to the longitudinal length of the opening, as shown in FIG. 6, such that upon applying an appropriate downward ram pressure, the sidewall 20a is flattened to a flat and planar configuration, without interruption of the integral connection between the sidewall 20a and the adjacent portions of tubular housing 4. The sidewall 20 can be separately formed by reversing of the location of the tubular member within the press unit, but can be formed through a single action by using a single anvil within the passageway and opposite press rams, not shown. Any other suitable method of flattening the walls can of course be employed but it is important to have the walls formed as not only flat walls but walls which are parallel to each other for optimal results of the thermal anemometer.

After the forming of the flat side walls 20 and 20a as well as the vent holes, the rod-like thermal flow sensor element 8, the ambient temperature sensor 9 and compensator 10 can be mounted into the housing 4 and connected by wiring into circuit. Such mounting of the units can be in accordance with prior constructions. As noted however for optimal results and in accordance with the preferred embodiment of this invention, the heated flow sensor element is located at the upstream, or entrance, opening to the sensing passageway. In addition, the ambient temperature sensor 9 and compensator 10 are each a small flat element which is shown secured to the bottom flat wall of the passageway with the suitable adhesive 11 and 11a.

After the mounting of the element or as a final step, the outer end of the tubular housing 4 is sealed with the seal member 16. This is readily provided as by putting a small removable dam element within the open end of the tubular housing 4 immediately at or outwardly of the passageway 7. A molten plastic is introduced into the open end of the formed housing 4 to form the seal member 16 adjacent to the outer end of the passageway 7. The plastic is allowed to cool and set. By appropriate selection of plastic, the material bonds to the stainless steel and produces a positive seal of the outer end of the tubular housing. The sealed end minimize any tendency of air to flow into the open end with possible turbulence of air in the sensing passageway 7.

A practical embodiment has been constructed with a tube diameter of thirty one hundredth of an inch. The openings had length of about nine tenths of an inch and the openings were each cut to a depth of about twenty percent of the diameter.

As previously noted, the tubular housing 4 is readily commercially available as a hardened stainless steel. The openings for passageway 7 can be readily cut using known milling procedures. Additionally, other methods and means can of course be readily applied. Thus, although not used to date, laser cutting tools can be used to accurately form each of the openings. Other forms for cutting of material are available, and subsequent development may also provide a suitable means for forming of the openings. Presses for flattening of the sidewalls to form the parallel sidewalls are of course commercially and readily available and provide a practical and inexpensive method of forming the sidewalls.

The present invention thus provides a highly improved thermal anemometer including a practical and cost effective manufacture of the product.

Various modes of carrying out the invention are contemplated as being within the scope of the following claims particularly pointing out and distinctly claiming the subject matter which is regarded as the invention.

I claim:

1. A method of forming a tubular sensor responsive to air passing over the sensor, comprising the steps of: assembling a metal tubular member having a sensing end portion having an outer open end and being of an essentially constant circular cross-section, cutting identical openings in opposed sides of said end portion, with said openings extending completely through said sides and being aligned and joined by connecting walls having circumferential edges, thereby defining a sensing passageway having an outer end spaced from said outer open end of said sensing end portion and having an innermost end spaced from said outer end, flattening the connecting walls of said tubular member between said openings of said sensing passageway into parallel flat walls, closing the outer open end of the sensing end portion, and installing a heat sensitive unit in said sensing passageway.

2. The method of claim 1, including forming each said opening projecting into said tubular member about twenty percent of its diameter with said circumferential edges of said connecting walls being spaced from each other by approximately sixty percent of the diameter of said circular cross section.

3. The method of claim 1, wherein said tubular member is located within the air with said openings forming an upstream opening and a downstream opening of said passageway and wherein the installing of the heat sensitive unit include the steps of mounting an elongated and self-supporting heated sensing element within said passageway generally centrally between said parallel flat walls, and said mounting further locating said element within the passageway adjacent to the upstream opening of said passageway.

4. The method of claim 1, wherein said tubular member has an inner wall surface and including mounting an ambient temperature sensing element adjacent the innermost end of said passageway to subject said element to ambient temperature and including securing said ambient temperature sensing element to the inner wall surface of said tubular member with a resilient flexible adhesive.

5. The method of claim 1, including selecting said tubular member formed of a hardened stainless steel.

6. The method of claim 1, including completing the step of closing said outer open end of said sensing end portion prior to said installing of said heat sensitive unit.

7. The method of claim 6, wherein said closing of the outer open end of said sensing end portion includes filling said sensing end portion from the outer end of the sensing passageway outwardly toward the outer open end with a molten thermal plastic mass to close said sensing portion at said outer end of said sensing passageway.

8. The method of claim 1, including cutting a vent hole in said tubular member in axially spaced relation to said sensing passageway to improve the response characteristic of the sensor.

* * * * *